(12) United States Patent
Parko et al.

(10) Patent No.: US 12,377,490 B2
(45) Date of Patent: Aug. 5, 2025

(54) HEAT EXCHANGER FOR FRICTION STIR WELDING APPARATUS AND ASSOCIATED SYSTEM AND METHOD

(71) Applicant: The Boeing Company, Arlington, VA (US)

(72) Inventors: Aaron Parko, Athens, AL (US); Todd Renz, Toney, AL (US); Timothy Walters, Madidon, AL (US)

(73) Assignee: The Boeing Company, Arlington, VA (US)

( * ) Notice: Subject to any disclaimer, the term of this patent is extended or adjusted under 35 U.S.C. 154(b) by 148 days.

(21) Appl. No.: 18/466,647

(22) Filed: Sep. 13, 2023

(65) Prior Publication Data

US 2025/0083249 A1 Mar. 13, 2025

(51) Int. Cl.
  *B23K 20/12* (2006.01)
  *F28F 5/02* (2006.01)

(52) U.S. Cl.
  CPC ............ *B23K 20/1235* (2013.01); *F28F 5/02* (2013.01)

(58) Field of Classification Search
  CPC ............ B23K 20/1235; B23K 20/1255; B23K 20/122–1295; F28F 5/02
  USPC ............................................... 228/112.1, 2.1
  See application file for complete search history.

(56) References Cited

U.S. PATENT DOCUMENTS

| 9,010,613 | B1 * | 4/2015 | Matlack | ............. B23K 20/1225 228/2.1 |
| 2017/0266756 | A1 * | 9/2017 | Katoh | ................. B23K 20/1255 |
| 2023/0311241 | A1 * | 10/2023 | Miyawaki | ............ B23K 20/126 228/112.1 |

(Continued)

FOREIGN PATENT DOCUMENTS

| CA | 3081330 A1 * | 5/2019 | ............. B22F 10/00 |
| CN | 105689885 A * | 6/2016 | ......... B23K 20/1235 |
| CN | 106583917 A * | 4/2017 | ......... B23K 20/1245 |

(Continued)

OTHER PUBLICATIONS

Tool for Two Types of Friction Stir Welding, Manufacturing & Prototyping, Oct. 1, 2006, pp. 1-4, Marshall Space Flight Center, Alabama, accessed from https://www.techbriefs.com/component/content/article/tb/pub/techbriefs/manufacturing-prototyping/1055 on Sep. 13, 2023.

(Continued)

Primary Examiner — Kiley S Stoner
(74) Attorney, Agent, or Firm — Kunzer Bean & Adamson

(57) ABSTRACT

A heat exchanger for a self-reacting friction stir welding apparatus includes a collar. The collar includes a collar flow inlet, a collar flow outlet, and an internal conduit fluidically coupling the collar flow inlet and the collar flow outlet. The heat exchanger also includes a rotary union having a first rotary-union flow outlet fluidically coupled with the collar flow inlet, a first rotary-union flow inlet fluidically coupled with the collar flow outlet, a second rotary-union flow inlet, (Continued)

and a second rotary-union flow outlet. The rotary union is co-rotatable with the collar. The heat exchanger further includes a manifold that has a first manifold flow outlet fluidically coupled with the second rotary-union flow inlet and a first manifold flow inlet fluidically coupled with the second rotary-union flow outlet. The rotary union is rotatable relative to the manifold.

20 Claims, 6 Drawing Sheets

(56) References Cited

U.S. PATENT DOCUMENTS

2025/0083249 A1* 3/2025 Parko .................. F28F 5/02

FOREIGN PATENT DOCUMENTS

| CN | 106735856 A | * | 5/2017 | ......... B23K 20/1245 |
| CN | 106808083 A | * | 6/2017 | ......... B23K 20/1245 |
| CN | 107470772 A | * | 12/2017 | ........... B23K 20/122 |
| CN | 108015406 A | * | 5/2018 | |
| CN | 110102873 A | * | 8/2019 | |
| CN | 111098016 A | * | 5/2020 | ........... B23K 20/122 |
| CN | 111761198 A | * | 10/2020 | ......... B23K 20/1245 |
| CN | 112122768 A | * | 12/2020 | ........... B23K 20/122 |
| CN | 112355463 A | * | 2/2021 | |
| CN | 112355464 A | * | 2/2021 | ........... B23K 20/122 |
| CN | 113458585 A | * | 10/2021 | |
| CN | 113953648 A | * | 1/2022 | ......... B23K 20/1245 |
| CN | 114083107 A | * | 2/2022 | |
| WO | WO-03035320 A1 | * | 5/2003 | ............. B23K 20/12 |
| WO | WO-2011070749 A1 | * | 6/2011 | ............. B23K 20/12 |
| WO | WO-2012060439 A1 | * | 5/2012 | ............. B23K 20/12 |
| WO | WO-2022122446 A1 | * | 6/2022 | ........... B23K 20/122 |

OTHER PUBLICATIONS

Friction Stir Welding, PAR Systems, pp. 1-2, accessed from https://www.par.com/wp-content/uploads/2023/05/PAR_FSW.pdf on Sep. 13, 2023.

Mechanism for Self-Reacted Friction Stir Welding, Mechanical & Fluid Systems, Oct. 1, 2004, pp. 1-4, Marshall Space Flight Center, Alabama, accessed from https://www.techbriefs.com/component/content/article/tb/pub/techbriefs/mechanics-and-machinery/672 on Sep. 13, 2023.

* cited by examiner

HEAT EXCHANGER FOR FRICTION STIR WELDING APPARATUS AND ASSOCIATED SYSTEM AND METHOD

GOVERNMENT LICENSE RIGHTS

This invention was made with Government support under contract number NNM07AB03C awarded by NASA. The government has certain rights in this invention.

FIELD

This disclosure relates generally to friction stir welding, and more particularly to a heat exchanger, a system, and a method for transferring heat from a root shoulder of a self-reacting friction stir welding apparatus.

BACKGROUND

Friction stir welding is a process that permanently joins together metal parts along a bond line using a non-consumable rotating tool. With the metal parts abutting each other along an intended bond line, the rotating tool is spun and passed through the metal parts along the intended bond line. Friction between the rotating tool and the metal parts generates heat, which, when sufficiently high, softens the material near the tool. The tool mechanically intermixes the softened material of the metal parts and the intermixed material is forged (e.g., compressed) to consolidate the material. The intermixed and consolidated material solidifies to form a weld that permanently join the metal parts along the bond line.

In conventional friction stir welding processes, a large anvil or base is used to support the metal parts from underneath and to provide a structure against which the intermixed material is compressed by a crown shoulder. In such processes, the rotating tool penetrates only a portion of the thickness of the metal parts. The anvil provides the added benefit of acting as a heat sink to dissipate excess heat away from the weld site, which helps moderate the temperature of the material and avoid defects in the weld caused by overheating.

Unlike conventional friction stir welding processes, self-reacting friction stir welding processes do not use a large anvil to support the metal parts being joined. Rather, self-reacting friction stir welding processes use a rotating tool that penetrates through an entire thickness of the metal parts and rely on a root shoulder attached to the rotating tool to provide the necessary support underneath the metal parts. Although self-reacting friction stir welding provides some benefits over conventional friction stir welding, the absence of a heat-dissipating anvil underneath the metal parts creates heat management issues. Some known self-reacting friction stir welding techniques flow coolant over the weld site as the rotating tool moves along the metal parts being joined. However, this technique is not conducive to many applications, including aerospace applications. Accordingly, dissipating excess heat away from a weld site using self-reacting friction stir welding processes can be difficult.

SUMMARY

The subject matter of the present application has been developed in response to the present state of the art, and in particular, in response to the shortcomings of conventional self-reacting friction stir welding techniques, that have not yet been fully solved by currently available techniques. Accordingly, the subject matter of the present application has been developed to provide a heat exchanger for a friction stir welding apparatus, and associated systems and methods, which overcomes at least some of the above-discussed shortcomings of prior art techniques.

The following is a non-exhaustive list of examples, which may or may not be claimed, of the subject matter, disclosed herein.

Disclosed herein is a heat exchanger for a self-reacting friction stir welding apparatus. The heat exchanger includes a collar configured to be secured to and co-rotatable with a root shoulder of the self-reacting friction stir welding apparatus. The collar is made of a thermally conductive material and comprises a collar flow inlet, a collar flow outlet, and an internal conduit fluidically coupling the collar flow inlet and the collar flow outlet. The heat exchanger also includes a rotary union comprising a first rotary-union flow outlet fluidically coupled with the collar flow inlet, a first rotary-union flow inlet fluidically coupled with the collar flow outlet, a second rotary-union flow inlet, and a second rotary-union flow outlet. The rotary union is coupled to the collar such that the rotary union is co-rotatable with the collar. The heat exchanger further includes a manifold that has a first manifold flow outlet fluidically coupled with the second rotary-union flow inlet and a first manifold flow inlet fluidically coupled with the second rotary-union flow outlet. The manifold is coupled to the rotary union such that the rotary union is rotatable relative to the manifold. The preceding subject matter of this paragraph characterizes example 1 of the present disclosure.

The collar includes a clamp that is selectively tightenable to clamp down on the root shoulder. The preceding subject matter of this paragraph characterizes example 2 of the present disclosure, wherein example 2 also includes the subject matter according to example 1, above.

The collar is made of a metallic material and the internal conduit is formed in and defined by the metallic material. The preceding subject matter of this paragraph characterizes example 3 of the present disclosure, wherein example 3 also includes the subject matter according to any of examples 1-2, above.

The collar has a semi-annular shape and the internal conduit extends through the collar and defines a semi-annular flow path. The preceding subject matter of this paragraph characterizes example 4 of the present disclosure, wherein example 4 also includes the subject matter according to any of examples 1-3, above.

The collar includes a central aperture that defines a thermal interface with a mating portion of the root shoulder when the collar is secured to the root shoulder. The preceding subject matter of this paragraph characterizes example 5 of the present disclosure, wherein example 5 also includes the subject matter according to any of examples 1-4, above.

The central aperture has a non-round cross-sectional shape. The preceding subject matter of this paragraph characterizes example 6 of the present disclosure, wherein example 6 also includes the subject matter according to example 5, above.

The heat exchanger further includes a coupling fixed to the collar and the rotary union, wherein the coupling prevents the collar from rotating relative to the rotary union. The preceding subject matter of this paragraph characterizes example 7 of the present disclosure, wherein example 7 also includes the subject matter according to any of examples 1-6, above.

The heat exchanger further includes a first flow inlet tube that fluidically couples the first rotary-union flow outlet and the collar flow inlet, and a first flow outlet tube that fluidically couples the first rotary-union flow inlet and the collar flow outlet. The preceding subject matter of this paragraph characterizes example 8 of the present disclosure, wherein example 8 also includes the subject matter according to any of examples 1-7, above.

The manifold further includes a second manifold flow inlet fluidically coupled with the first manifold flow outlet, and a second manifold flow outlet fluidically coupled with the first manifold flow inlet. The heat exchanger further includes a cold flow source configured to supply a cold flow to the second manifold flow inlet and a hot flow return configured to receive a hot flow from the second manifold flow outlet. The preceding subject matter of this paragraph characterizes example 9 of the present disclosure, wherein example 9 also includes the subject matter according to any of examples 1-8, above.

When the collar and the rotary union are rotating relative to the manifold, the cold flow from the cold flow source is flowable through the manifold, from the second manifold flow inlet to the first manifold flow outlet, through the rotary union, from the second rotary-union flow inlet to the first rotary-union flow outlet, and into the internal conduit of the collar via the collar flow inlet. When the collar and the rotary union are rotating relative to the manifold, the hot flow is flowable from the internal conduit of the collar, via the collar flow outlet, through the rotary union, from the first rotary-union flow inlet to the second rotary-union flow outlet, through the manifold, from the first manifold flow inlet to the second manifold flow outlet, and to the hot flow return. The preceding subject matter of this paragraph characterizes example 10 of the present disclosure, wherein example 10 also includes the subject matter according to example 9, above.

The rotary union further includes a housing comprising the first rotary-union flow outlet and the first rotary-union flow inlet, a shaft coupled to the manifold, so that the shaft does not rotate relative to the manifold, and comprising the second rotary-union flow inlet and the second rotary-union flow outlet, a cold-flow internal conduit fluidically coupling the second-rotary flow inlet and the first rotary-union flow outlet, and a hot-flow internal conduit fluidically coupling the first rotary-union flow inlet and the second rotary-union flow outlet. The cold-flow internal conduit and the hot-flow internal conduit extend through the housing and the shaft. The preceding subject matter of this paragraph characterizes example 11 of the present disclosure, wherein example 11 also includes the subject matter according to any of examples 1-10, above.

Further disclosed herein is a self-reacting friction stir welding system. The self-reacting friction stir welding system includes a self-reacting friction stir welding apparatus that includes a crown shoulder rotatable relative to a workpiece, a pin including a stirring section and is coupled to the crown shoulder, is co-rotatable with the crown shoulder, and is translationally moveable relative to the crown shoulder, and a root shoulder coupled to the pin so that the root shoulder is co-rotatable with the pin and translationally co-moveable with the pin. A gap is defined between the crown shoulder and the root shoulder. The gap is equal to a thickness of the workpiece. The stirring section of the pin is positioned within the gap. The self-reacting friction stir welding system also comprises a heat exchanger that includes a collar secured to and co-rotatable with the root shoulder. The collar is made of a thermally conductive material and comprises a collar flow inlet, a collar flow outlet, and an internal conduit fluidically coupling the collar flow inlet and the collar flow outlet. The heat exchanger also includes a rotary union that includes a first rotary-union flow outlet fluidically coupled with the collar flow inlet, a first rotary-union flow inlet fluidically coupled with the collar flow outlet, a second rotary-union flow inlet, and a second rotary-union flow outlet. The rotary union is coupled to the collar such that the rotary union is co-rotatable with the collar. The heat exchanger further includes a manifold that includes a first manifold flow outlet fluidically coupled with the second rotary-union flow inlet and a first manifold flow inlet fluidically coupled with the second rotary-union flow outlet. The manifold is coupled to the rotary union such that the rotary union is rotatable relative to the manifold. The preceding subject matter of this paragraph characterizes example 12 of the present disclosure.

The collar is clamped onto and forms a thermal interface with the root shoulder. The preceding subject matter of this paragraph characterizes example 13 of the present disclosure, wherein example 13 also includes the subject matter according to example 12, above.

The root shoulder includes a surface having a non-round cross-sectional shape and the collar comprises a central-aperture defining the thermal interface and having a non-round cross-sectional shape that compliments the non-round cross-sectional shape of the surface of the root shoulder. The preceding subject matter of this paragraph characterizes example 14 of the present disclosure, wherein example 14 also includes the subject matter according to example 13, above.

The self-reacting friction stir welding apparatus and the heat exchanger are translationally co-movable along a joint between parts of the workpiece. The preceding subject matter of this paragraph characterizes example 15 of the present disclosure, wherein example 15 also includes the subject matter according to any of examples 12-14, above.

The collar is secured to the root shoulder so that heat in the root shoulder is transferable, via conduction, to the collar. The preceding subject matter of this paragraph characterizes example 16 of the present disclosure, wherein example 16 also includes the subject matter according to any of examples 12-15, above.

The self-reacting friction stir welding system further includes a pump selectively operable to pump cold flow into and through the manifold, from a second manifold flow inlet to the first manifold flow outlet, through the rotary union, from the second rotary-union flow inlet to the first rotary-union flow outlet, and into the internal conduit of the collar via the collar flow inlet. The self-reacting friction stir welding system also includes a pump selectively operable to pump hot flow from the internal conduit of the collar, via the collar flow outlet, through the rotary union, from the first rotary-union flow inlet to the second rotary-union flow outlet, through the manifold, from the first manifold flow inlet to a second manifold flow outlet, and out of the manifold. The hot flow includes the cold flow plus heat from the root shoulder. The preceding subject matter of this paragraph characterizes example 17 of the present disclosure, wherein example 17 also includes the subject matter according to any of examples 12-16, above.

Additionally disclosed herein is a method of friction stir welding together parts of a workpiece along a joint between the parts of the workpiece. The method includes co-rotating, relative to the workpiece, a crown shoulder, a pin coupled to the crown shoulder, a root shoulder coupled to the pin, a collar secured to the root shoulder, and a rotary union coupled with the collar. The method also includes, when co-rotating the crown shoulder, the pin, the root shoulder, the collar, and the rotary union, translationally moving the pin, the root shoulder, the collar, the rotary union, and a manifold, coupled with the rotary union, along the joint when the workpiece is positioned within a gap defined between the crown shoulder and the root shoulder. The method further includes when translationally moving the pin, the root shoulder, the collar, the rotary union, and the manifold along the joint, stirring together material of the parts of the workpiece with a stirring portion of the pin located within the gap. The method additionally includes when stirring together the material, transferring heat from the root shoulder to the collar and from the collar to a fluid flowing through the collar. The method also includes supplying the fluid to the collar via the rotary union and the manifold. The method further includes retrieving the fluid from the collar via the rotary union and the manifold. The preceding subject matter of this paragraph characterizes example 18 of the present disclosure.

The method further includes supplying the fluid to the manifold via a cold flow source that is rotatably fixed relative to the workpiece, retrieving the fluid from the manifold via a hot flow return that is rotatably fixed relative to the workpiece, and rotating the manifold relative to the rotary union, when co-rotating and translationally moving the crown shoulder, the pin, the root shoulder, the collar, and the rotary union, so that the manifold is rotatably fixed relative to the workpiece, the cold flow source, and the hot flow return. The preceding subject matter of this paragraph characterizes example 19 of the present disclosure, wherein example 19 also includes the subject matter according to example 18, above.

The heat is transferred from the root shoulder to the collar via conduction. The preceding subject matter of this paragraph characterizes example 20 of the present disclosure, wherein example 20 also includes the subject matter according to any of examples 18-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The present disclosure includes multiple examples that overcome the shortcomings of conventional methods of self-reacting friction stir welding together metal parts of a workpiece. Because self-reacting friction stir welding methods do not have the luxury of a large anvil heatsink to help dissipate heat, dissipating heat from the weld site can be more challenging, especially where open liquid drip systems are not feasible. In examples of the present disclosure, a heat exchanger specifically configured to dissipate heat from self-reacting friction stir welding apparatus is disclosed. The heat exchanger helps to dissipate heat from a location underneath the weld site, which targets the primary source of overheating in self-reacting friction stir welding apparatuses and does not obstruct driving operations of the rotating tool above the weld site.

Figure 1:
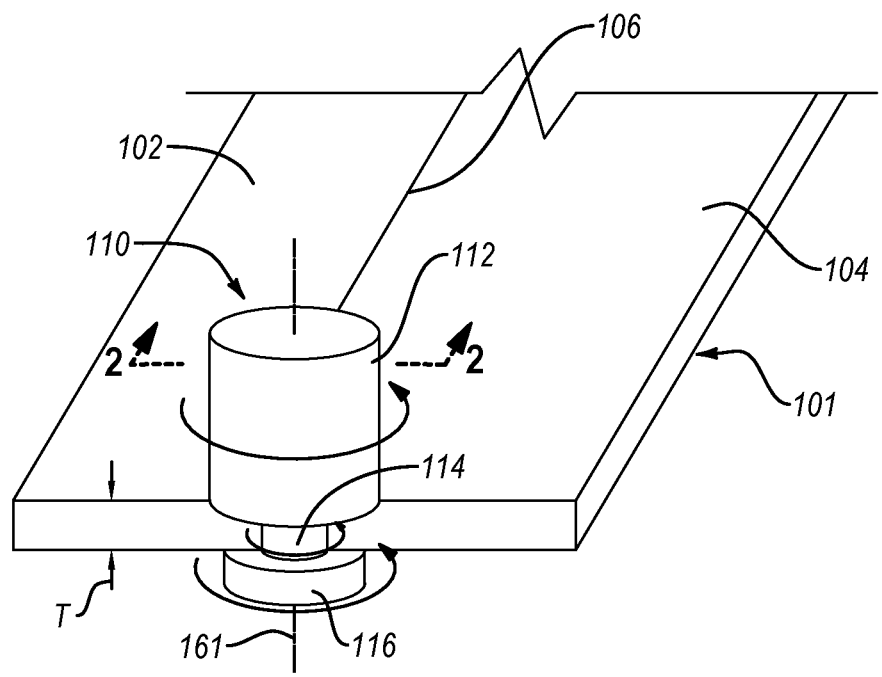
FIG. 1 is a perspective view of a self-reacting stir welding apparatus, in the process of joining two parts together, according to one or more examples of the present disclosure.
Figure 2:
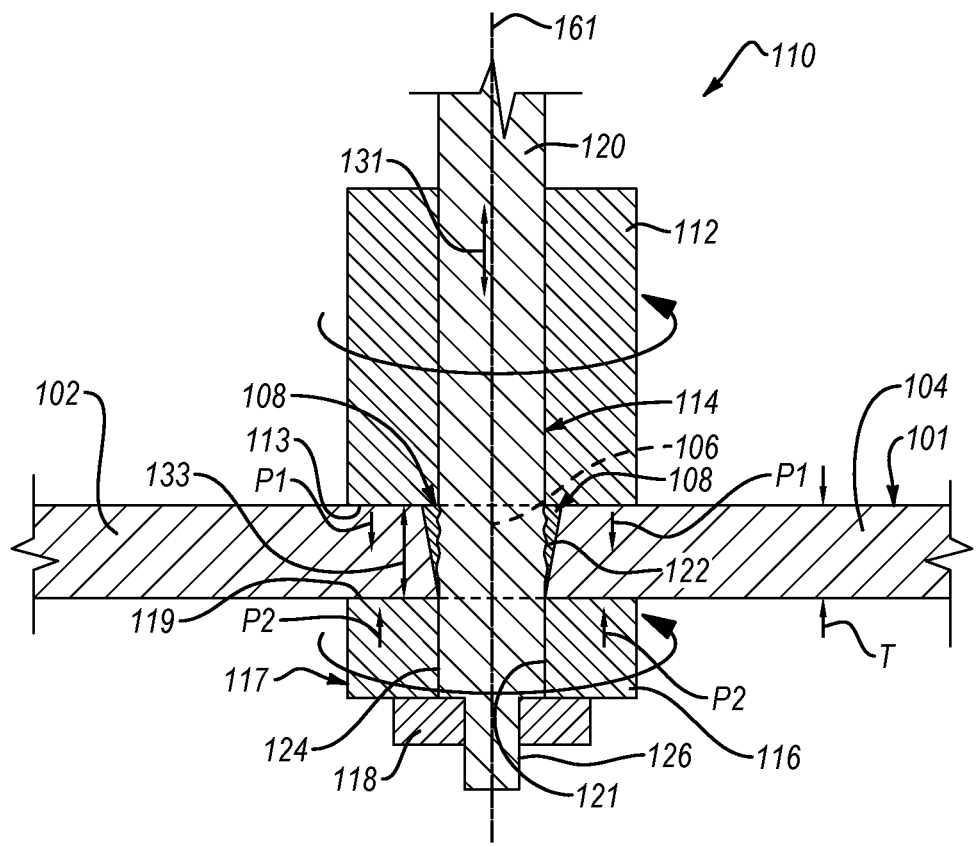
FIG. 2 is cross-sectional side elevation view of the self-reacting stir welding apparatus of FIG. 1, taken along the line 2-2 of FIG. 1, according to one or more examples of the present disclosure.

Referring to FIGS. 1 and 2, one example of a self-reacting friction stir welding apparatus 110 (hereinafter also known as "the apparatus 110") is shown bonding together a first part 102 and a second part 104 of a workpiece 101 using a self-reacting friction stir welding process. The apparatus 110 includes a crown shoulder 112, a pin 114, and a root shoulder 116.

The crown shoulder 112 is rotatable relative to the workpiece 101, about a central axis 161 of the self-reacting friction stir welding apparatus 110, as shown by a rotational arrow. Moreover, the crown shoulder 112 is positionable so that a contact surface 113 of the crown shoulder 112 contacts and applies a downward pressure P1 onto an upper surface of the workpiece 101 (see, e.g., FIG. 3).

The pin 114 is coupled with the crown shoulder 112 so that the pin 114 co-rotates with the crown shoulder 112 about the central axis 161. In some examples, the crown shoulder 112 and the pin 114 are coupled together via a weld head assembly. The weld head assembly can include a drawbar that receives, in threaded engagement, the pin 114. The weld head assembly can include actuators that enable co-rotation of the drawbar, the crown shoulder 112, and the pin 114. The pin 114 is translationally movable axially along the crown shoulder 112 toward and away from the workpiece 101, as shown by directional arrows 131. The crown shoulder 112 includes a central channel within which the pin 114 translates (e.g., slides) up and down when the workpiece 101 is horizontal. In certain examples, the weld head assembly includes a linear actuator that translationally moves the pin 114 within the central channel of the crown shoulder 112.

As shown in FIG. 2, the pin 114 includes a stirring section 122 that is configured to stir the material of the first part 102 and the second part 104 of the workpiece 101. The stirring section 122 can include threads, ridges, circumferential teeth, and the like designed to stir material at a leading side of the pin 114 and reposition the stirred material to a trailing side of the pin 114 as the pin 114 is translationally moved along the joint 106. The pin 114 also includes a shaft section 120, a root-shoulder engagement section 124 and a threaded section 126. The stirring section 122 is intermediate the shaft section 120 and the root-shoulder engagement section 124, and the root-shoulder engagement section 124 is intermediate the stirring section 122 and the threaded section 126.

The root shoulder 116 is coupled to the pin 114 so that the root shoulder 116 is co-rotatable with the pin 114, about the central axis 161, and translationally co-moveable with the pin 114 along the central axis 161. The root shoulder 116 is coupled to the root-shoulder engagement section 124 of the pin 114 and retained in place by a fastener (e.g., a nut 118) threadably engaged with the threaded section 126 of the pin 114. Because the root shoulder 116 is retained in place on the pin 114 via the nut 118, translational movement of the pin 114 relative to the crown shoulder 112, in a direction away from the workpiece 101, results in translational movement of the root shoulder 116 in the same direction and a positioning of a contact surface 119 of the root shoulder 116 against a lower surface of the workpiece 101. This positioning of the root shoulder 116 results in the contact surface 119 of the root shoulder 116 contacting and applying an upward pressure P2 (opposite the downward pressure P1) onto the lower surface of the workpiece 101. In certain examples, the root shoulder 116 has an interior channel 121 with a non-circular cross-sectional shape and the root-shoulder engagement section 124 has a non-circular cross-sectional shape complimenting the shape of the interior channel 121 of the root shoulder 116. In this manner, engagement between the interior channel 121 of the root shoulder 116 and the root-shoulder engagement section 124 prevents the root shoulder 116 from rotating relative to the pin 114. In one example, the interior channel 121 of the root shoulder 116 and the root-shoulder engagement section 124 have a polygonal cross-sectional shape.

A gap 133 is defined between the interface surface of the crown shoulder 112 and the interface surface of the root shoulder 116. The gap 133 is adjustable by translationally moving the pin 114 relative to the crown shoulder 112. When bonding the first part 102 to the second part 104, the gap 133 is equal to the thickness T of the workpiece 101 and the stirring section 122 of the pin 114 is positioned within the gap 133.

Although not shown, the self-reacting friction stir welding apparatus 110 also includes one or more actuators engaged with the pin 114 and/or the crown shoulder 112 and selectively operable to rotate the pin 114 and the crown shoulder 112 and to translationally move the pin 114 relative to the crown shoulder 112. The one or more actuators can include motors, linear actuators, pneumatic cylinders, robotic arms, and the like.

Referring to FIG. 1, a self-reacting friction stir welding process includes rotating the crown shoulder 112, the pin 114, and the root shoulder 116 about the central axis 161. The process also includes positioning the apparatus 110 such that the workpiece 101 is positioned within the gap 133 and the stirring section 122 of the pin 114 is placed in contact with a leading edge of the workpiece 101 at a butt joint (e.g., joint 106) between the first part 102 and the second part 104. Eventually, the friction from the contact with the leading edge generates enough heat that the material of the first part 102 and the second part 104, forming the butt joint, softens and intermixes. The intermixed material 108 is compressed or consolidated because of the opposing pressures applied by the crown shoulder 112 and the root shoulder 116. After softening and intermixing begins at the leading edge, the apparatus 110 is translationally moved along the joint 106 of the workpiece 101 (e.g., along the butt joint between the first part 102 and the second part 104) so that the stirring section 122 can soften and intermix the material of the first part 102 and the second part 104 along the joint 106. After the stirring section 122 translates along an entirety of the joint 106, the intermixed material 108 is allowed to cool and harden, thus forming the weld between the first part and the second part 104.

The heat generated by the friction between the stirring section 122 and the material must be high enough to soften and intermix the material. However, the heat cannot exceed some threshold temperature associated with the creation of abnormalities and defects in the weld. Some of the heat generated by the friction is transferred to the crown shoulder 112 and the root shoulder 116. If not dissipated, the heat accumulated in the crown shoulder 112 and the root shoulder 116 increases over time, which results in an increase in temperature at the weld site. Accordingly, without dissipating heat from at least one of the crown shoulder 112 and the root shoulder 116 during the friction stir welding process, the temperature at the weld site can eventually increase above the threshold temperature. As described below, a heat exchanger is coupled with the apparatus 110 to help dissipate heat from the apparatus 110 and keep the temperature at the weld site below the threshold temperature.

Figure 3:
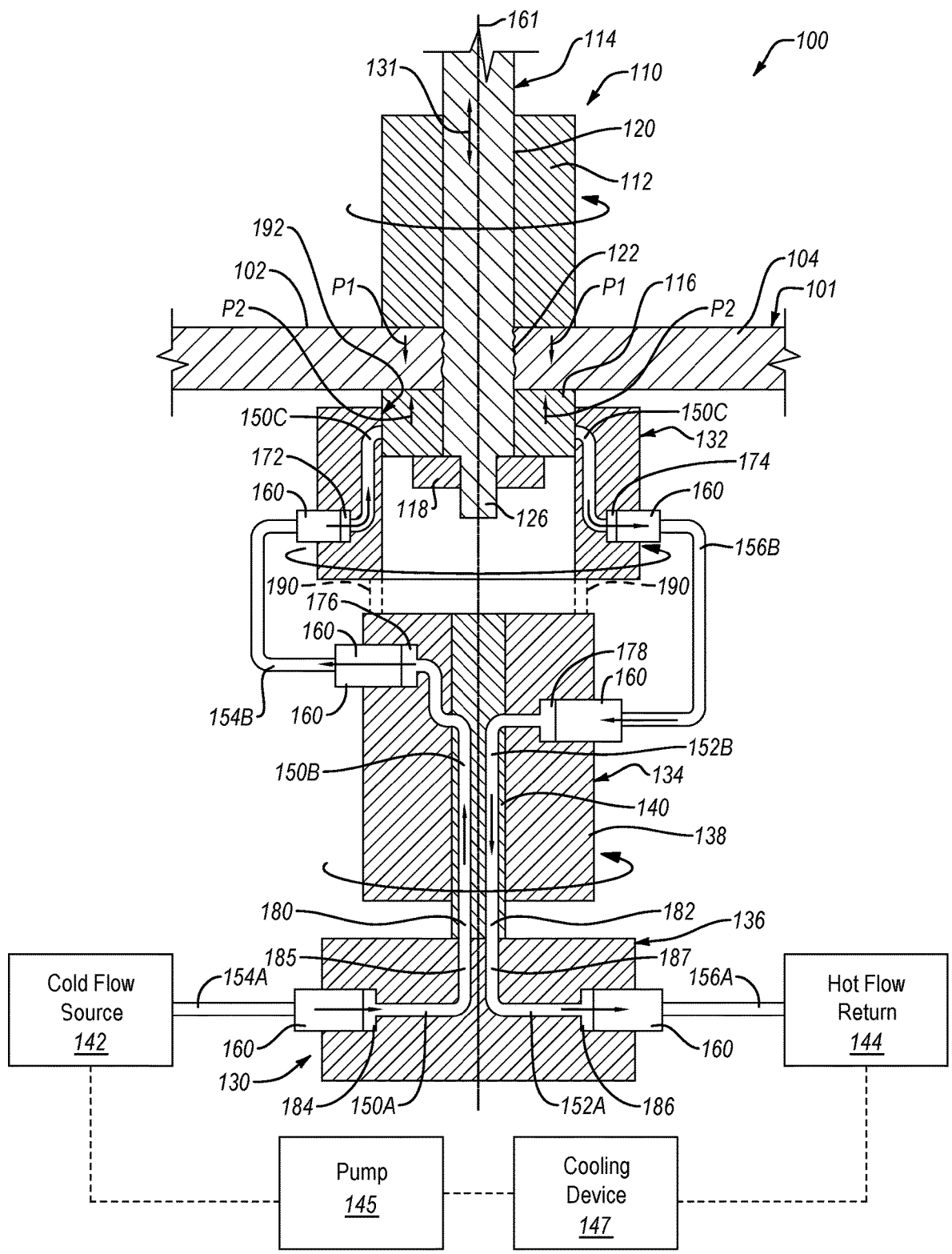
FIG. 3 is a cross-sectional side elevation view of a self-reacting stir welding system, taken along a line similar to the line 2-2 of FIG. 1, according to one or more examples of the present disclosure.
Figure 4:
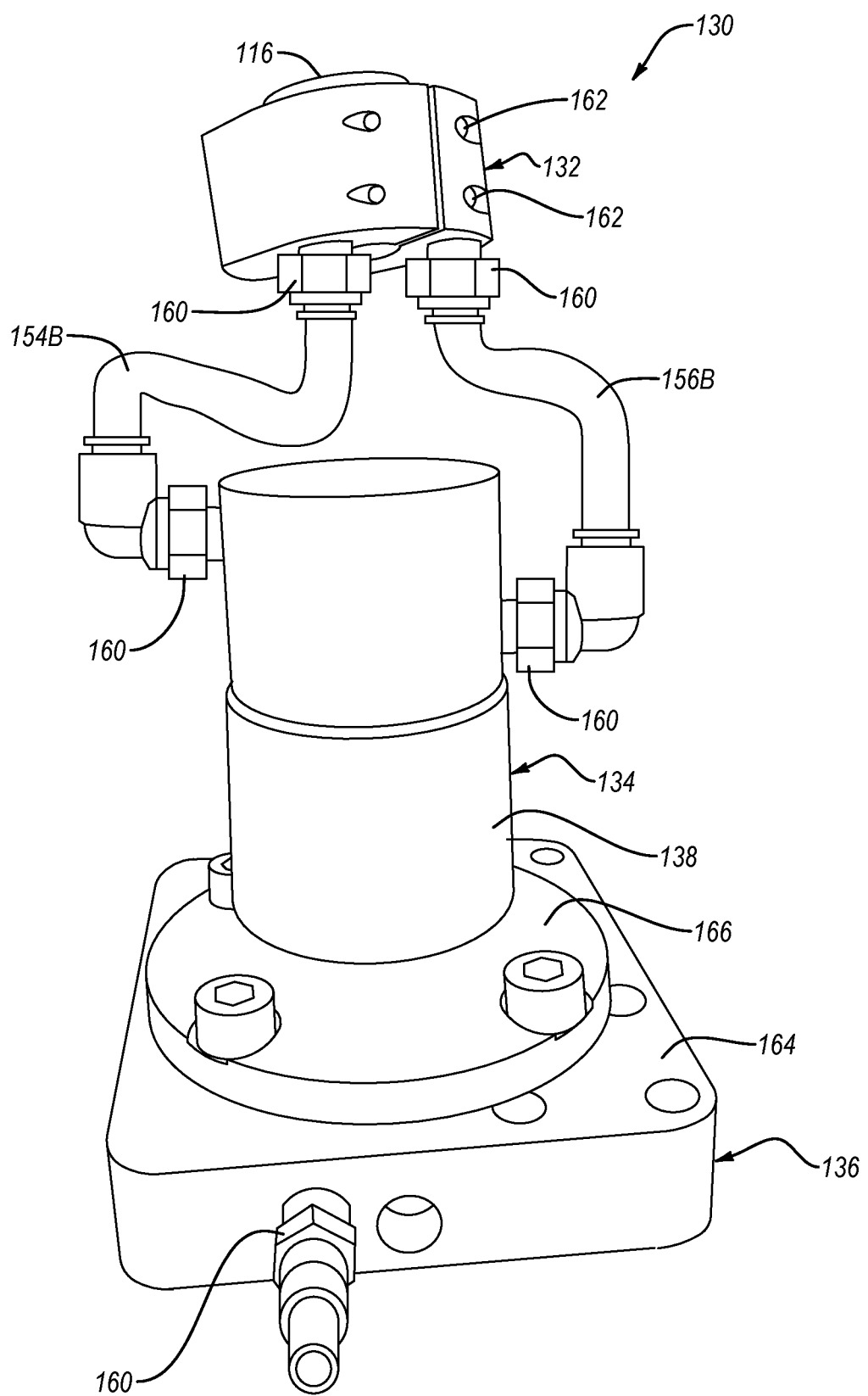
FIG. 4 is a perspective view a heat exchanger for a self-reacting friction stir welding apparatus, according to one or more examples of the present disclosure.
Figure 5:
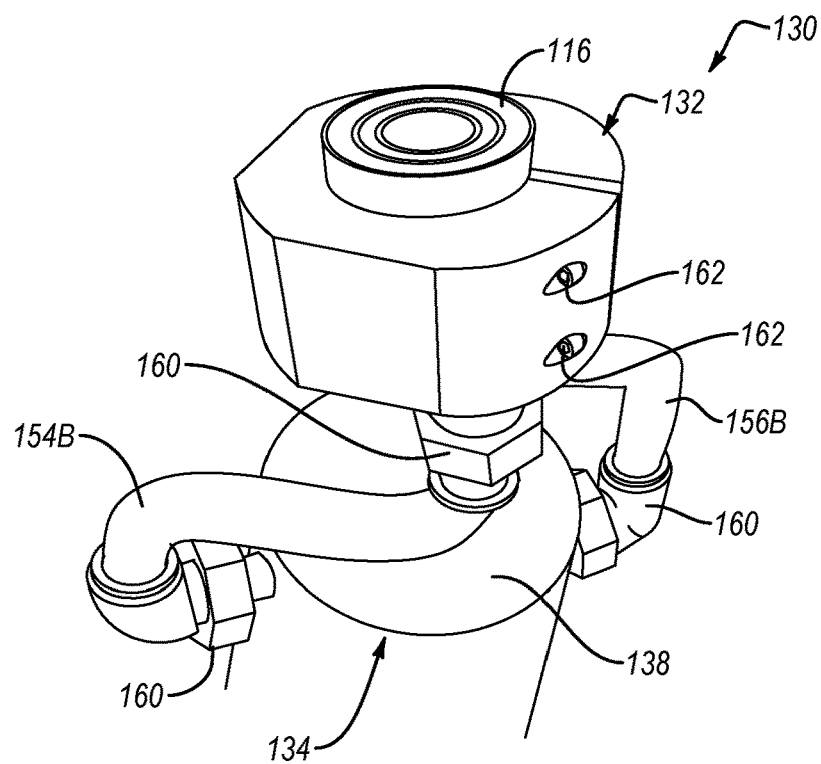
FIG. 5 is a perspective view of a portion of the heat exchanger of FIG. 4, according to one or more examples of the present disclosure.
Figure 6:
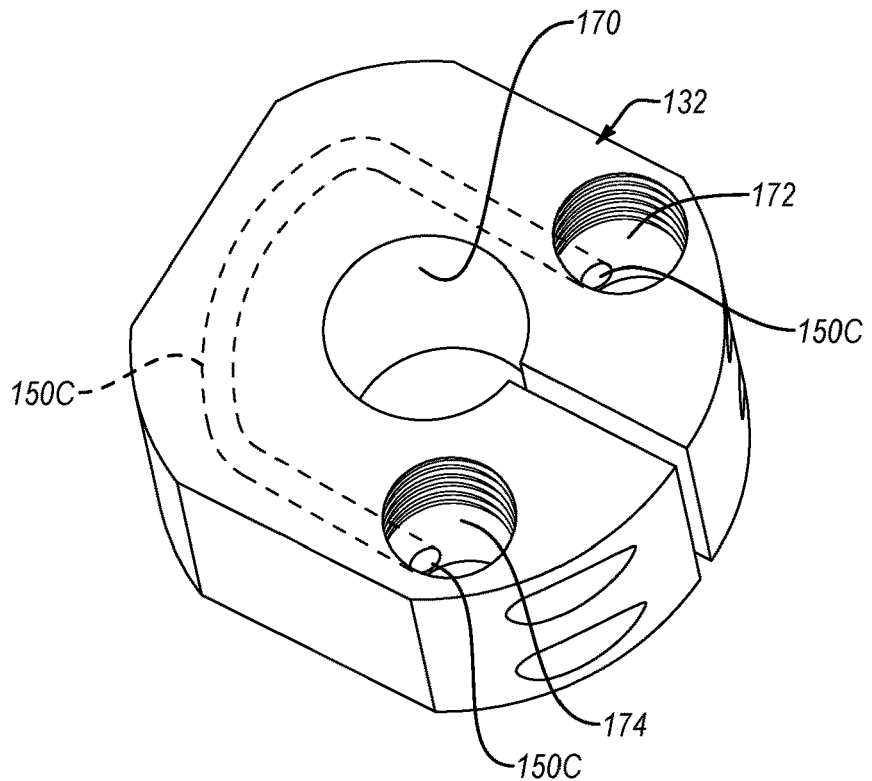
FIG. 6 is a perspective view of a collar of a heat exchanger for a self-reacting friction stir welding apparatus, according to one or more examples of the present disclosure.
Figure 7:
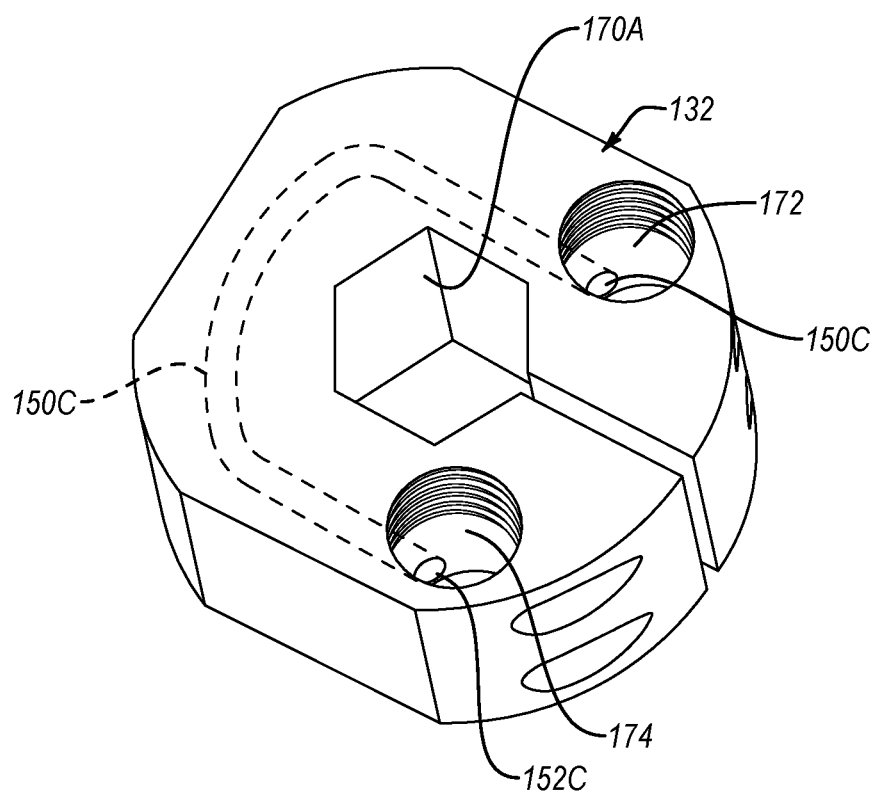
FIG. 7 is a perspective view of a collar of a heat exchanger for a self-reacting friction stir welding apparatus, according to one or more examples of the present disclosure.

Accordingly, as shown in FIGS. 3-5, a self-reacting friction stir welding system 100 includes the apparatus 110 and a heat exchanger 130. The heat exchanger 130 includes a collar 132, a rotary union 134, and a manifold 136. The collar 132 is configured to be secured in thermal engagement with the root shoulder 116 of the apparatus 110. Moreover, the collar 132 is securable to the root shoulder 116 so that the collar 132 is co-rotatable with the root shoulder 116. In one example, the collar 132 includes a clamp that can be tightenable around the root shoulder 116 to clamp down on the root should 116. Although the collar 132 can have any of various shapes, as shown in FIGS. 5-7 and in some examples, the collar 132 is generally C-shaped or semi-annular shaped. Additionally, the collar 132 defines a central aperture 170. The cross-sectional shape of the central aperture 170 corresponds with the cross-sectional shape of the root shoulder 116. The collar 132, in some examples, is at least partially resiliently flexible to reduce the size of the central aperture 170 when tightened. In this manner, the collar 132 can be placed around the root shoulder 116 and tightened, such as via fasteners 162 (see, e.g., FIGS. 4 and 5) so that the wall defining the central aperture 170 comes into intimate contact with the root shoulder 116, thus defining a thermal interface 192 with the root shoulder 116 (see, e.g., FIG. 3).

Secure attachment of the collar 132 to the root shoulder 116 promotes co-rotation of the collar 132 and the root shoulder 116. In some examples, the root shoulder 116 includes a mating portion 117 with which the collar 132 mates. The mating portion 117 mates with the central aperture 170 of the collar 132. In certain examples, the mating portion 117 and the central aperture 170 have the same non-round cross-sectional shapes (e.g., polygonal (see, e.g., the central aperture 170A of FIG. 7)), such that when mated, the collar 132 is prevented from rotating relative to the root shoulder 116. The interface between the surface of the central aperture 170 and the mating portion 117 establishes the thermal interface 192 between the root shoulder 116 and the collar 132. The intimate contact associated with the thermal interface 192 enables heat transfer from the root shoulder 116 to the collar 132 via conduction. According to certain examples, a thermally conductive gel, paste, or deformable material is positioned between the thermal interface 192 to promote heat transfer across the thermal interface 192. To further promote heat transfer from the root shoulder 116 to the collar 132, the collar 132 is made of a thermally conductive material, such as a metallic material (e.g., copper alloy, aluminum alloy, and the like).

The rotary union 134 of the heat exchanger 130 is configured to enable the flow of fluid between a stationary object and a rotating object. In one example, as shown in FIG. 3, the rotary union 134 includes a housing 138 and a shaft 140 about which the housing 138 is rotatable. The shaft 140 can be a dual-channel shaft, which includes an inner hollow shaft inside an outer hollow shaft. The dual-channel shaft defines an inner fluid flow channel through the inner hollow shaft and a separate outer fluid flow channel between the inner hollow shaft and the outer hollow shaft. The inner fluid flow channel is fluidically coupled with a fluid channel formed in the housing 138, which remain open to the inner fluid flow channel as the housing 138 rotates around the shaft 140. Similarly, the outer fluid flow channel is fluidically coupled with a separate fluid channel formed in the housing 138, which remain open to the outer fluid flow channel as the housing 138 rotates around the shaft 140.

The rotary union 134 is coupled to the collar 132 such that the rotary union 134 is co-rotatable with the collar 132 about the central axis 161. In the illustrated examples, the rotary union 134 is co-rotatable with the collar 132 because the housing 138 of the rotary union 134 co-rotates with the collar 132, even though the shaft 140 rotates relative to the collar 132. Accordingly, as used herein, the collar 132 and the rotary union 134 co-rotate when at least one part of the rotary union 134 (e.g., the housing 138) co-rotates with the collar 132. In some examples, a coupling between the housing 138 and the collar 132 enables co-rotation between them. In one example, the heat exchanger 130 includes a coupling 190 that is fixed to the collar 132 and to the housing 138. The coupling 190 prevents the collar 132 from rotating relative to the rotary union 134. The coupling 190 can be any of various couplings, such as a fastener, adhesive, weld, and the like. In some examples, the coupling between the housing 138 and the collar 132, which enables co-rotation, includes the fixed or flexible tubes that fluidically connect the collar 132 to the rotary union 134, as described in more detail below.

The manifold 136 of the heat exchanger 130 is coupled to the rotary union 134 so that the rotary union 134 is rotatable relative to the manifold 136. In the illustrated examples, the rotary union 134 is rotatable relative to the manifold 136 because the housing 138 of the rotary union 134 rotates relative to the manifold 136 about the central axis 161. More specifically, the shaft 140 of the rotary union 134 is fixed to the manifold 136 in a manner that prevents rotation of the shaft 140 relative to the manifold 136, and the housing 138 rotates relative to the shaft 140 and thus relative to the manifold 136. Referring to FIG. 4, the shaft 140 includes a lower flange 166 that is fastened to an interface surface 164 of the manifold 136. Accordingly, as used herein, the manifold 136 and the rotary union 134 rotate relative to each other when at least one part of the rotary union 134 (e.g., the housing 138) rotates relative to the manifold 136.

As shown in FIG. 3, the heat exchanger 130 also includes a cold flow source 142, a hot flow return 144, a pump 145, and a cooling device 147. Generally, the pump 145 is configured to actively drive a flow of fluid through the manifold 136, the rotary union 134, and the collar 132. The flow enters the manifold 136 as a cold flow, from the cold flow source 142, and exits the manifold 136 as a hot flow, to be received by the hot flow return 144. In certain examples, the heat exchanger 130 is a closed system, such that the hot flow from the hot flow return 144 is passed through a cooling device 147, such as a secondary heat exchanger, to cool the fluid before introducing it to the cold flow source 142. In some examples, the cold flow source 142 and the hot flow return 144 are simply reservoirs, tubes, tanks, hoses, and the like that are capable of containing fluid. As defined herein, fluid means any flowable material, such as a liquid (e.g., water, coolant, etc.) or gas (e.g., air), capable of transporting and storing thermal energy.

The manifold 136, the rotary union 134, and the collar 132 include various flow outlets, flow inlets, and internal conduits that facilitate the flow of fluid through the manifold 136, the rotary union 134, and the collar 132. Additionally, the heat exchanger 130 includes various external tubes that can facilitate the flow of fluid into and out of one or more of the manifold 136, the rotary union 134, and the collar 132. The flow outlets, flow inlets, internal conduits, and external tubes help define a closed-circuit flow path of the heat exchanger 130.

Referring to FIG. 3, the manifold 136 includes a first manifold flow outlet 185, a first manifold flow inlet 187, a second manifold flow inlet 184, and a second manifold flow outlet 186. The second manifold flow inlet 184 is fluidically coupled with the first manifold flow outlet 185 via a first manifold internal conduit 150A formed in the manifold 136. The first manifold flow inlet 187 and the second manifold flow outlet 186 are fluidically coupled with a second manifold internal conduit 152A formed in the manifold 136. In this manner, cold flow from the cold flow source 142 is enabled to flow through the manifold 136 from the second manifold flow inlet 184 to the first manifold flow outlet 185. Similarly, hot flow is enabled to flow through the manifold 136 from the first manifold flow inlet 187 to the second manifold flow outlet 186, and then to the hot flow return 144. In some examples, the heat exchanger 130 includes a second flow inlet tube 154A that fluidically couples the cold flow source 142 with the second manifold flow inlet 184. The second flow inlet tube 154A can be fluidically connected to the second manifold flow inlet 184 via one of a plurality of fluid fittings 160 of the heat exchanger 130. Also, in some examples, the heat exchanger 130 includes a second flow outlet tube 156A that fluidically couples the hot flow return 144 with the second manifold flow outlet 186. The second flow outlet tube 156A can be fluidically connected to the second manifold flow outlet 186 via one of the plurality of fluid fittings 160 of the heat exchanger 130.

The rotary union 134 includes a first rotary-union flow outlet 176, a first rotary-union flow inlet 178, a second rotary-union flow inlet 180, and a second rotary-union flow outlet 182. The first rotary-union flow outlet 176 is fluidically coupled with the second rotary-union flow inlet 180 via a cold-flow internal conduit 150B of the rotary union 134. The first rotary-union flow inlet 178 is fluidically coupled with the second rotary-union flow outlet 182 via a hot-flow internal conduit 152B of the rotary union 134. In this manner, cold flow is enabled to flow through the rotary union 134 from the second rotary-union flow inlet 180 to the first rotary-union flow outlet 176. Similarly, hot flow is enabled to flow through the rotary union 134 from the first rotary-union flow inlet 178 to the second rotary-union flow outlet 182.

In some examples, the first rotary-union flow outlet 176 and the first rotary-union flow inlet 178 are formed in the housing 138 of the rotary union 134, and the second rotary-union flow inlet 180 and a second rotary-union flow outlet 182 are formed in the shaft 140 of the rotary union 134. Additionally, in such examples, the cold-flow internal conduit 150B and the hot-flow internal conduit 152B are formed in and extend through both the housing 138 and the shaft 140.

The collar 132 includes a collar flow inlet 172 and a collar flow outlet 174. The collar flow inlet 172 and the collar flow outlet 174 are fluidically coupled via an internal conduit 150C formed in and extending through the collar 132. In some examples, the internal conduit 150C is machined in the metallic material of the collar 132 so that the internal conduit 150C is circumferentially closed by the metallic material of the collar 132. In this manner, heat stored in the collar 132 can be more efficiently transferred to fluid flowing through the internal conduit 150C. The internal conduit 150C can have any of various shapes configured to promote heat transfer to the fluid. In one example, as shown in FIGS. 6 and 7, the internal conduit 150C has the same general shape as the collar 132, such as semi-annular. In other examples, the internal conduit 150C can have a more circuitous or undulating shape in order to increase the surface area of the internal conduit 150C to promote more efficient heat transfer.

Referring again to FIG. 3, the conduits of the collar 132, the rotary union 134, and the manifold are fluidically interconnected to form the closed-circuit flow path of the heat exchanger 130. In the illustrated example, the first manifold flow outlet 185 is fluidically coupled with the second rotary-union flow inlet 180 to receive cold flow from the manifold 136 via the second rotary-union flow inlet 180. Similarly, the collar flow inlet 172 is fluidically coupled with the first rotary-union flow outlet 176 to receive cold flow from the rotary union 134. In some examples, the fluidic coupling between the collar flow inlet 172 and the first rotary-union flow outlet 176 is provided by a first flow inlet tube 154B and corresponding fluid fittings 160. As the cold flow passes through the internal conduit 150C of the collar 132, the fluid is heated via thermal heat transfer from the material of the collar 132 into the fluid. The cold flow transitions into the hot flow within the collar 132 after heat has transferred to the fluid. In the illustrated example, the first rotary-union flow inlet 178 is fluidically coupled with the collar flow outlet 174 to receive hot flow from the collar 132 via the collar flow outlet 174. In some examples, the fluidic coupling between the collar flow outlet 174 and the first rotary-union flow inlet 178 is provided by a first flow outlet tube 156B and corresponding fluid fittings 160. The first manifold flow inlet 187 is fluidically coupled with the second rotary-union flow outlet 182 to receive hot flow from the rotary union 134.

Figure 8:
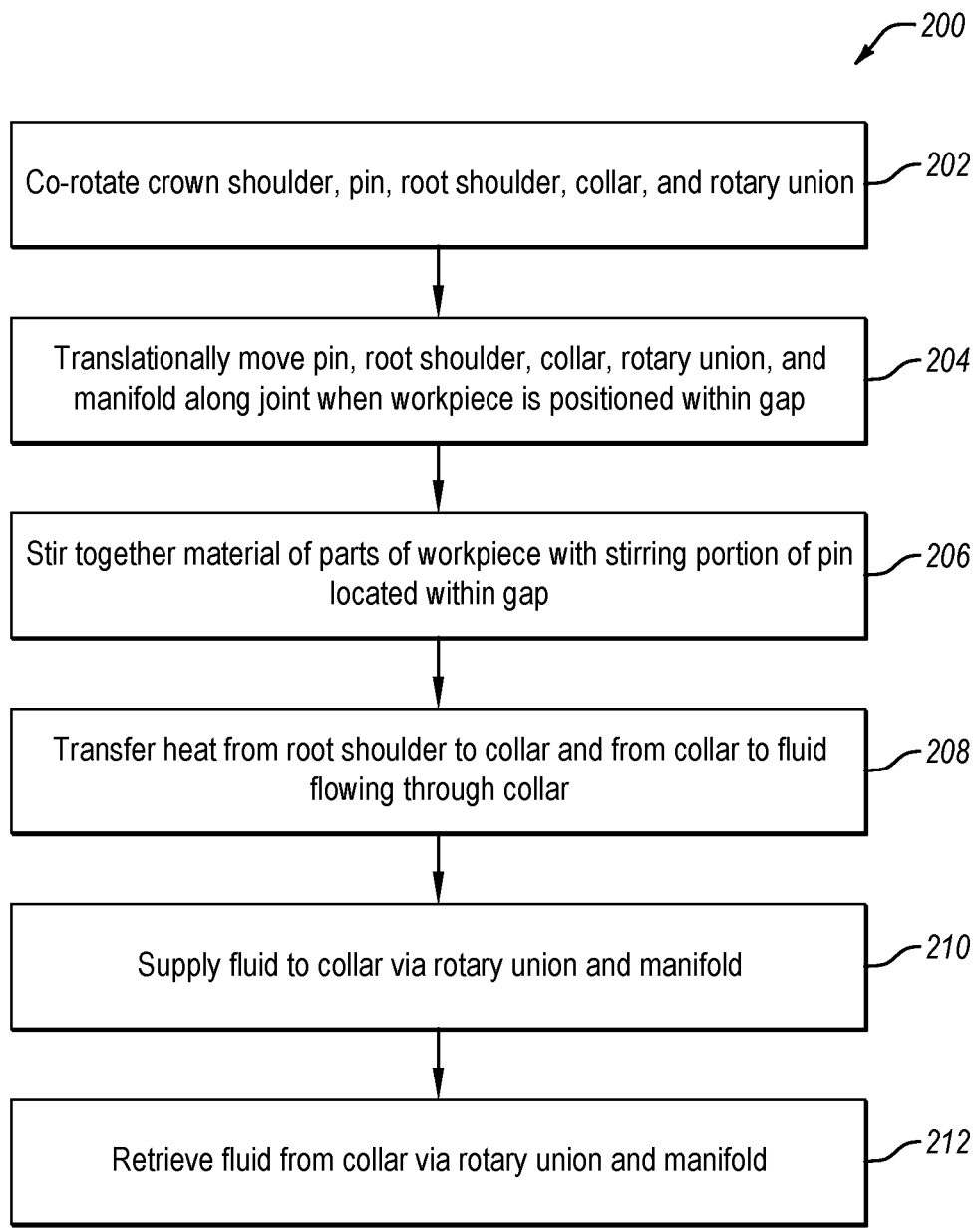
FIG. 8 is a schematic flow chart of a method of friction stir welding together parts of a workpiece, according to one or more examples of the present disclosure.

Referring to FIG. 8, according to some examples, a method 200 of friction stir welding together parts of the workpiece 101 along the joint 106, between the parts of the workpiece 101 helps to dissipate heat from the root shoulder 116 during a self-reacting friction stir welding process. The method 200 includes (block 202) co-rotating the crown shoulder 112, the pin 114, and the root shoulder 116 of the self-reacting friction stir welding apparatus 110, together with the collar 132 and the rotary union 134 of the heat exchanger 130. The method 200 additionally includes (block 204) translationally moving the pin 114, the root shoulder 116, the collar 132, the rotary union 134, and the manifold 136 along the joint 106, when co-rotating the crown shoulder 112, the pin 114, the root shoulder 116, the collar 132, and the rotary union 134. The manifold 136 stays rotationally fixed relative to the workpiece 101 as the pin 114, the root shoulder 116, the collar 132, and the rotary union 134 rotate relative to the workpiece 101. The workpiece 101 is positioned within the gap 133 during translational movement of the components. The method 200 further includes (block 206) stirring together material of the parts of the workpiece 101 with the stirring section 122 of the pin 114, when translationally moving the pin 114, the root shoulder 116, the collar 132, the rotary union 134, and the manifold 136 along the joint 106.

The method 200 also includes (block 208) transferring heat (e.g., via conduction) from the root shoulder 116 to the collar 132, and from the collar 132 to the fluid flowing through the collar 132 when the material is being stirred together. The method 200 additionally includes (block 210) supplying the fluid to the collar 132 via the rotary union 134 and the manifold 136 and (block 212) retrieving the fluid from the collar 132 via the rotary union 134 and the manifold 136.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A heat exchanger for a self-reacting friction stir welding apparatus, comprising:
    a collar configured to be secured to and co-rotatable with a root shoulder of the self-reacting friction stir welding apparatus, wherein the collar is made of a thermally conductive material and comprises a collar flow inlet, a collar flow outlet, and an internal conduit fluidically coupling the collar flow inlet and the collar flow outlet;
    a rotary union comprising a first rotary-union flow outlet fluidically coupled with the collar flow inlet, a first rotary-union flow inlet fluidically coupled with the collar flow outlet, a second rotary-union flow inlet, and a second rotary-union flow outlet, wherein the rotary union is coupled to the collar such that the rotary union is co-rotatable with the collar; and
    a manifold comprising a first manifold flow outlet fluidically coupled with the second rotary-union flow inlet and a first manifold flow inlet fluidically coupled with the second rotary-union flow outlet, wherein the manifold is coupled to the rotary union such that the rotary union is rotatable relative to the manifold.

2. The heat exchanger according to claim 1, wherein the collar comprises a clamp that is selectively tightenable to clamp down on the root shoulder.

3. The heat exchanger according to claim 1, wherein the collar is made of a metallic material and the internal conduit is formed in and defined by the metallic material.

4. The heat exchanger according to claim 1, wherein the collar has a semi-annular shape and the internal conduit extends through the collar and defines a semi-annular flow path.

5. The heat exchanger according to claim 1, wherein the collar comprises a central aperture that defines a thermal interface with a mating portion of the root shoulder when the collar is secured to the root shoulder.

6. The heat exchanger according to claim 5, wherein the central aperture has a non-round cross-sectional shape.

7. The heat exchanger according to claim 1, further comprising a coupling fixed to the collar and the rotary union, wherein the coupling prevents the collar from rotating relative to the rotary union.

8. The heat exchanger according to claim 1, further comprising:
    a first flow inlet tube that fluidically couples the first rotary-union flow outlet and the collar flow inlet; and
    a first flow outlet tube that fluidically couples the first rotary-union flow inlet and the collar flow outlet.

9. The heat exchanger according to claim 1, wherein:
    the manifold further comprises a second manifold flow inlet fluidically coupled with the first manifold flow outlet, and a second manifold flow outlet fluidically coupled with the first manifold flow inlet; and the heat exchanger further comprises:
- a cold flow source configured to supply a cold flow to the second manifold flow inlet; and
- a hot flow return configured to receive a hot flow from the second manifold flow outlet.

10. The heat exchanger according to claim 9, wherein, when the collar and the rotary union are rotating relative to the manifold:
- the cold flow from the cold flow source is flowable through the manifold, from the second manifold flow inlet to the first manifold flow outlet, through the rotary union, from the second rotary-union flow inlet to the first rotary-union flow outlet, and into the internal conduit of the collar via the collar flow inlet; and
- the hot flow is flowable from the internal conduit of the collar, via the collar flow outlet, through the rotary union, from the first rotary-union flow inlet to the second rotary-union flow outlet, through the manifold, from the first manifold flow inlet to the second manifold flow outlet, and to the hot flow return.

11. The heat exchanger according to claim 1, wherein the rotary union further comprises:
- a housing comprising the first rotary-union flow outlet and the first rotary-union flow inlet;
- a shaft coupled to the manifold, so that the shaft does not rotate relative to the manifold, and comprising the second rotary-union flow inlet and the second rotary-union flow outlet;
- a cold-flow internal conduit fluidically coupling the second rotary-union flow inlet and the first rotary-union flow outlet; and
- a hot-flow internal conduit fluidically coupling the first rotary-union flow inlet and the second rotary-union flow outlet;
- wherein the cold-flow internal conduit and the hot-flow internal conduit extend through the housing and the shaft.

12. A self-reacting friction stir welding system, comprising:
- a self-reacting friction stir welding apparatus, comprising:
  - a crown shoulder rotatable relative to a workpiece;
  - a pin comprising a stirring section and is coupled to the crown shoulder, is co-rotatable with the crown shoulder, and is translationally moveable relative to the crown shoulder;
  - a root shoulder coupled to the pin so that the root shoulder is co-rotatable with the pin and translationally co-moveable with the pin; and
  - wherein a gap is defined between the crown shoulder and the root shoulder, the gap is equal to a thickness of the workpiece, and the stirring section of the pin is positioned within the gap; and
- a heat exchanger, comprising:
  - a collar secured to and co-rotatable with the root shoulder, wherein the collar is made of a thermally conductive material and comprises a collar flow inlet, a collar flow outlet, and an internal conduit fluidically coupling the collar flow inlet and the collar flow outlet;
  - a rotary union comprising a first rotary-union flow outlet fluidically coupled with the collar flow inlet, a first rotary-union flow inlet fluidically coupled with the collar flow outlet, a second rotary-union flow inlet, and a second rotary-union flow outlet, wherein the rotary union is coupled to the collar such that the rotary union is co-rotatable with the collar; and
  - a manifold comprising a first manifold flow outlet fluidically coupled with the second rotary-union flow inlet and a first manifold flow inlet fluidically coupled with the second rotary-union flow outlet, wherein the manifold is coupled to the rotary union such that the rotary union is rotatable relative to the manifold.

13. The self-reacting friction stir welding system according to claim 12, wherein the collar is clamped onto and forms a thermal interface with the root shoulder.

14. The self-reacting friction stir welding system according to claim 13, wherein the root shoulder comprises a surface having a non-round cross-sectional shape and the collar comprises a central-aperture defining the thermal interface and having a non-round cross-sectional shape that compliments the non-round cross-sectional shape of the surface of the root shoulder.

15. The self-reacting friction stir welding system according to claim 12, wherein the self-reacting friction stir welding apparatus and the heat exchanger are translationally co-movable along a joint between parts of the workpiece.

16. The self-reacting friction stir welding system according to claim 12, wherein the collar is secured to the root shoulder so that heat in the root shoulder is transferable, via conduction, to the collar.

17. The self-reacting friction stir welding system according to claim 12, further comprising a pump selectively operable to:
- pump cold flow into and through the manifold, from a second manifold flow inlet to the first manifold flow outlet, through the rotary union, from the second rotary-union flow inlet to the first rotary-union flow outlet, and into the internal conduit of the collar via the collar flow inlet; and
- pump hot flow from the internal conduit of the collar, via the collar flow outlet, through the rotary union, from the first rotary-union flow inlet to the second rotary-union flow outlet, through the manifold, from the first manifold flow inlet to a second manifold flow outlet, and out of the manifold;
- wherein the hot flow comprises the cold flow plus heat from the root shoulder.

18. A method of friction stir welding together parts of a workpiece along a joint between the parts of the workpiece, the method comprising:
- co-rotating, relative to the workpiece, a crown shoulder, a pin coupled to the crown shoulder, a root shoulder coupled to the pin, a collar secured to the root shoulder, and a rotary union coupled with the collar;
- when co-rotating the crown shoulder, the pin, the root shoulder, the collar, and the rotary union, translationally moving the pin, the root shoulder, the collar, the rotary union, and a manifold, coupled with the rotary union, along the joint when the workpiece is positioned within a gap defined between the crown shoulder and the root shoulder;
- when translationally moving the pin, the root shoulder, the collar, the rotary union, and the manifold along the joint, stirring together material of the parts of the workpiece with a stirring portion of the pin located within the gap;
- when stirring together the material, transferring heat from the root shoulder to the collar and from the collar to a fluid flowing through the collar;

supplying the fluid to the collar via the rotary union and the manifold; and retrieving the fluid from the collar via the rotary union and the manifold.

19. The method according to claim 18, further comprising:

supplying the fluid to the manifold via a cold flow source that is rotatably fixed relative to the workpiece;

retrieving the fluid from the manifold via a hot flow return that is rotatably fixed relative to the workpiece; and rotating the manifold relative to the rotary union, when co-rotating and translationally moving the crown shoulder, the pin, the root shoulder, the collar, and the rotary union, so that the manifold is rotatably fixed relative to the workpiece, the cold flow source, and the hot flow return.

20. The method according to claim 18, wherein the heat is transferred from the root shoulder to the collar via conduction.

* * * * *